United States Patent
Sun et al.

(10) Patent No.: US 10,303,654 B2
(45) Date of Patent: May 28, 2019

(54) HYBRID DATA DISTRIBUTION IN A MASSIVELY PARALLEL PROCESSING ARCHITECTURE

(71) Applicant: Futurewei Technologies, Inc., Plano, TX (US)

(72) Inventors: Jason Yang Sun, Palo Alto, CA (US); Qingqing Zhou, Santa Clara, CA (US)

(73) Assignee: Futurewei Technologies, Inc., Plano, TX (US)

(*) Notice: Subject to any disclaimer, the term of this patent is extended or adjusted under 35 U.S.C. 154(b) by 751 days.

(21) Appl. No.: 14/629,107

(22) Filed: Feb. 23, 2015

(65) Prior Publication Data
US 2016/0246785 A1 Aug. 25, 2016

(51) Int. Cl.
G06F 17/30 (2006.01)
*G06F 16/174* (2019.01)
*G06F 16/18* (2019.01)

(52) U.S. Cl.
CPC ........ *G06F 16/174* (2019.01); *G06F 16/1858* (2019.01); *G06F 17/3015* (2013.01); *G06F 17/30224* (2013.01); *G06F 17/30584* (2013.01)

(58) Field of Classification Search
None
See application file for complete search history.

(56) References Cited

U.S. PATENT DOCUMENTS

| | | | |
|---|---|---|---|
| 8,150,836 B2* | 4/2012 | Xu | G06F 17/30445 706/12 |
| 8,832,074 B2* | 9/2014 | Zhou | G06F 17/30445 707/713 |
| 9,355,127 B2* | 5/2016 | Gaza | G06F 17/30289 |
| 2007/0130231 A1 | 6/2007 | Brown et al. | |
| 2009/0024568 A1* | 1/2009 | Al-Omari | G06F 17/30498 |
| 2009/0248617 A1 | 10/2009 | Molini | |
| 2010/0114870 A1* | 5/2010 | Al-Omari | G06F 17/30445 707/718 |
| 2014/0108459 A1 | 4/2014 | Gaza et al. | |

OTHER PUBLICATIONS

"International Application Serial No. PCT/CN2016/072185, International Search Report dated Apr. 28, 2016", 6 pgs.
"International Application Serial No. PCT/CN2016/072185, Written Opinion dated Apr. 28, 2016", 4 pgs.
"European Application No. 16754737.1, Extended European Search Report dated Nov. 21, 2017", (dated Nov. 21, 2017), 8 pgs.

* cited by examiner

Primary Examiner — Jeff A Burke
(74) Attorney, Agent, or Firm — Schwegman Lundberg & Woessner, P.A.

(57) ABSTRACT

System and method for hybrid distribution mode in massively parallel processing (MPP) database preventing storage imbalance issues caused by data skew. Key values of the database are identified as outliers if records of those keys cause database skew. In hybrid mode, records having the outlier key values are distributed using a random distribution scheme. Other records are distributed using a hash distribution scheme. A threshold skew amount is configurable for the system. Record lookups, insertions, deletions, and updates are processed according to a query plan optimized for the distribution mode of the records referenced in a database query.

17 Claims, 7 Drawing Sheets

HYBRID DATA DISTRIBUTION IN A MASSIVELY PARALLEL PROCESSING ARCHITECTURE

FIELD OF THE INVENTION

The present disclosure relates generally to the field of database management, and more specifically, to the field of data distribution in a massively parallel processing (MPP) database.

BACKGROUND OF THE INVENTION

A primary goal of data distribution design in a massively parallel processing (MPP) database is even distribution of data among separate nodes of the system. In particular, multiple processors, each having independent operating systems and memory resources, are coordinated in order to process a program in parallel. Such a system may be referred to as "shared-nothing," where tables of database(s) are partitioned into segments and distributed amongst different processing nodes, with no data sharing occurring between processing nodes. Data is partitioned across processing nodes such that each processing node has a subset of rows from tables in the database. Each processing node processes only the rows on its own disks. The MPP database includes a coordinator system, which hosts the database but does not itself store database records, but rather metadata about the database. The coordinator system is able to host a database engine, the controlling entity of a MPP system, and can generate query plans, coordinate query execution by the processing nodes, and aggregate data system-wide. A common messaging interface interconnect is used by all processing nodes and the coordinator system for communication amongst the processing nodes and the coordinator.

When a database query arrives at the coordinator (e.g., from a client system), the query is divided and assigned to processing nodes according to a data distribution plan and an optimized execution plan. The processing entities in each processing node manage only their portion of the data. However, these processing entities may communicate with one another to exchange any needed information during execution. A query may be divided into multiple sub-queries, and the sub-queries may be executed in parallel or in some optimal order in some or all of the processing nodes. The results of the sub-queries may be aggregated and further processed, and subsequently additional sub-queries may the executed according to the results.

In a conventional MPP database system entries of a table are generally distributed using one of the following methods: hash; random (e.g., round-robin); range; or, list. Currently, many MPP databases distribute data using hash distribution. In hash distribution the key values of records are hashed into buckets, and the buckets are assigned to processing nodes. With hash distribution, data can be directly located through the key with minimum consumption of system resources. This provides a high performance characteristic for hash distribution, since lookup of a value by the key is straightforward, merely requiring calculation of the hash value to determine which node hosts that particular hash bucket. The query is sent to only that processing node, without involving other processing nodes. Another common method of distribution for a MPP database is a round-robin distribution. With round-robin distribution data is distributed around all processing nodes of the MPP database, which is useful for distributing records evenly into the nodes in the system. However, a disadvantage of round-robin distribution is in the area of looking up data records. In general, during a lookup of a record many (if not all) of the nodes in the system must be visited in order to locate the particular record. Thus, system resource utilization is less efficient for a MPP database using a conventional round-robin distribution scheme, as compared to a lookup on an MPP database using a hash distribution scheme.

One potential problem for MPP databases utilizing distribution by hash (as well as range or list) is the occurrence of skew. In cases where the distribution of the key value is not skewed, typically some buckets will be large while others are small. In most cases it is possible to place several large and small buckets together and to assign them to one processing node, the general goal being that every node has roughly equivalent size of overall data. However, in some cases the data distribution may be skewed, and records with a single key value may not fit in the storage of the designated processing node, while other processing nodes may have an abundance of remaining space. Simply adjusting the function by which the hash distribution is made will not address this issue and additional measures are needed to address the skew, particularly in the storage of the processing node. Data skew can also lead to an increase in the processing time required for executing a query, especially for that of a table join.

SUMMARY OF THE INVENTION

A dynamic distribution approach is described herein for addressing data skew in an MPP database. Embodiments according to the present disclosure provide a system and method of combining hash distribution and round-robin distribution for records of an MPP database, termed herein as a "hybrid" data distribution mode. A hybrid distribution is used as a means for preventing storage imbalance that can arise in storage systems that utilize hash distribution solely.

In one aspect of the present disclosure, the potential values of distribution key are divided into two sets. One set contains those value with high frequency, called the "outlier set." The other set contains the rest of the key values, and is called the "normal set." A hybrid data distribution mode distributes those records having a key value in the normal set using a hash distribution, while those records having a key value in the outlier set are distributed amongst processing nodes of the MPP database using a random (e.g., round-robin) method. In contrast to a pure hash (or range, or list) distribution mode, methods according to embodiments of the present disclosure avoid storage-and performance issues by distributing the records having a key indicating high frequency (e.g., keys in an outlier set) using round-robin method. However, in contrast to a pure round-robin distribution mode, methods according to embodiments of the present disclosure preserve the advantage of hash distribution for those key values not in the outlier set in that data can be directly located through a key value, with minimum consumption of system resource in a majority of cases. Only those lookups that include a high frequency key will involve all processing nodes of the MPP database, and further, in those cases it is advantageous to involve all nodes for processing because the number of potential qualified records may exceed the processing capacity of a single node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, embodiments according to the present disclosure provide a system and method for a hybrid distribution mode in a massively parallel processing (MPP) database, the hybrid distribution mode preventing storage imbalance issues caused by data skew. Key values of the database are identified as outliers if records of those keys cause database skew. In hybrid mode, records having the outlier key values are distributed using a random distribution scheme. Other records are distributed using a hash distribution scheme. A threshold for outlier determination is configurable for tables in the system. Record lookups, insertions, deletions, and updates are processed according to a query plan optimized for the distribution mode of the records referenced in a database query.

More specifically, embodiments according to the present disclosure provide a method of managing a massively parallel processing (MPP) database, the method including determining a criteria for distributing database records according to a hybrid data distribution mode for the MPP database. The MPP database has a plurality of processing nodes. The method further includes determining a set of outlier keys of the MPP database that satisfies the criteria. The method further includes updating the MPP database to distribute database records according to the hybrid data distribution mode.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

As used herein, a "pure" distribution scheme may refer to an MPP database distribution scheme wherein only one mode of distribution (e.g., hash, range, list, round-robin distribution) for key values of the MPP database is utilized. This is in contrast to the hybrid distribution mode described herein, which utilizes at least two distribution modes, for example, some key values distributed according to hash distribution, while others distributed according to random distribution.

Figure 1:
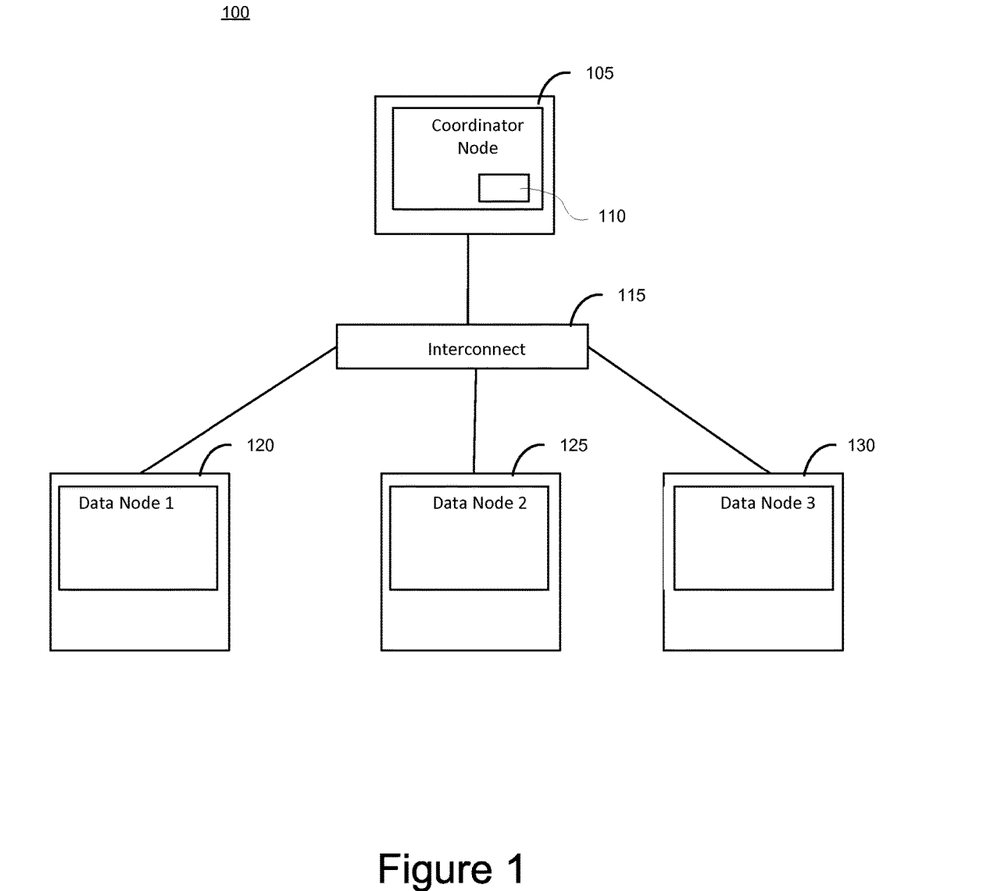
FIG. 1 is a block diagram depicting an exemplary massively parallel processing (MPP) database architecture, in accordance with an embodiment of the present disclosure.

FIG. 1 illustrates a system 100 capable of alleviating the occurrence of skew in a massively parallel processing (MPP) database, according to an embodiment of the present disclosure. The system 100 includes a coordinator node 105, including a memory storing computer readable instructions 110 for execution by a processor of the coordinator node. The MPP database system 100 includes an interconnect 115 providing communication amongst the coordinator node 105 and data processing nodes 120, 125, and 130. Each of the processing nodes 120-130 comprises a respective processor and storage for managing segments of one or more tables of the MPP database 100. The instructions 110 include instructions for monitoring the processing nodes 120-130 for data skew, and for instituting a hybrid data distribution scheme for the MPP database system 100 in order to prevent/resolve data skew within the processing nodes 120-130. The instructions 110 further include instructions for performing queries in a hybrid data distribution environment. These and other features of an MPP database according to the present disclosure are discussed in greater detail below. The separation of coordinator node and data processing nodes are logical, the coordinator node and data processing nodes can be implemented as one process, or separate processes running on one physical machine or even on different machines.

Hybrid Data Distribution in MPP Database

Figure 2:
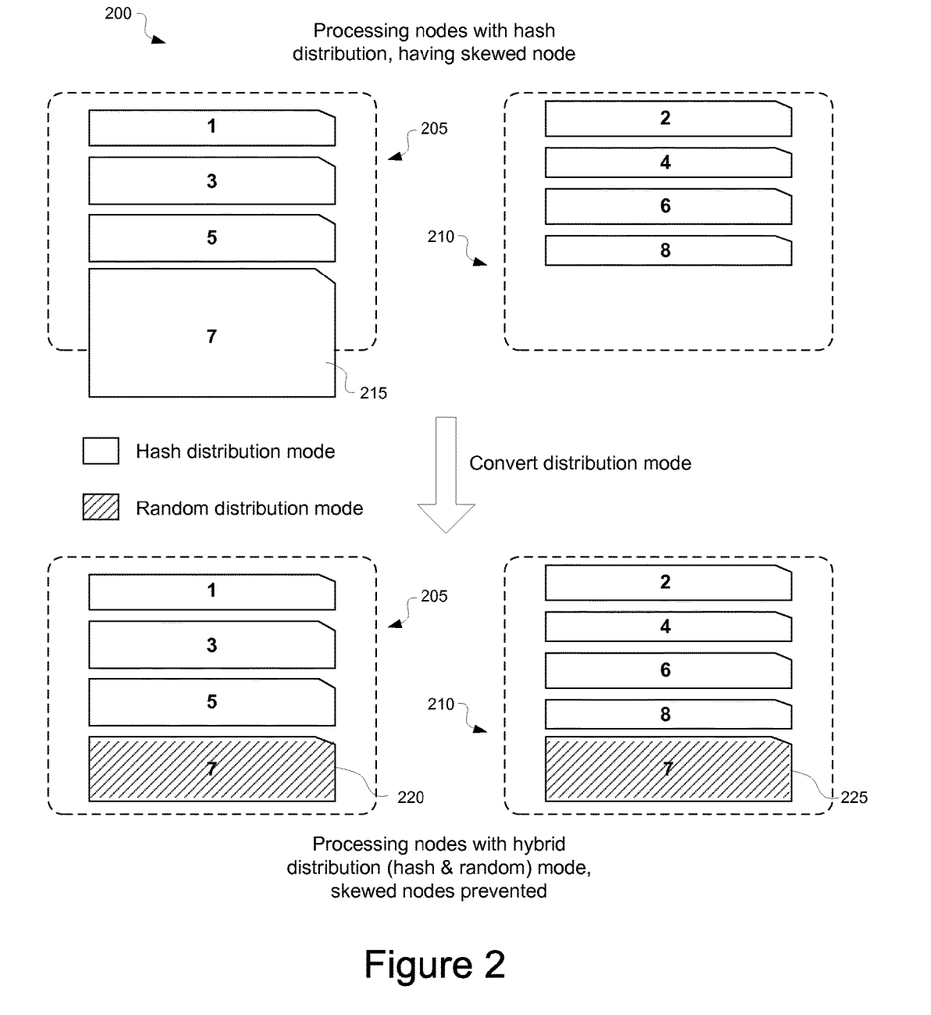
FIG. 2 is a schematic illustration depicting a database node satisfying a criterion for conversion from a hash to a hybrid distribution mode, in accordance with an embodiment of the present disclosure.

Referring now to FIG. 2, a portion of an MPP database 200 is depicted, the portion of the MPP database 200 including processing nodes 205 and 210. Each of the processing nodes 205 and 210 is configured to store records of a database, the records being organized corresponding to the manner in which key values (e.g., key values 1-8) are distributed in the processing nodes 205 and 210. An initial distribution for the processing nodes 205 and 210 is depicted at the top of FIG. 2. The key values 1, 3, 5, and 7 are distributed on processing node 205, while key values 2, 4, 6, and 8 are distributed on processing node 210. The distribution can be according to a conventional hash distribution scheme.

As depicted, the hash distribution scheme has resulted in data that are skewed. In particular, key value 7 is identified as an outlier 215, having a much larger size than other key values (e.g., corresponds to many more records). As a result of skew the processing efficiency of the overall MPP database may be compromised, as the processing loads are unequal between the processing node 205 and 210. The significantly greater amount of data stored on processing node 205 can cause storage space shortage on node 205, and it can also lead to longer processing times for queries performed on the records therein, compared to the processing times of queries performed on the relatively fewer records of processing node 210. Further, the greater number of records at processing node 205 increases the likelihood that a given query will include records stored on processing node 205, further contributing to imbalanced processing in the MPP database. As a primary goal of an MPP database is that of balanced processing, a mostly equal distribution of records amongst the nodes is preferable in furtherance of this goal.

According to embodiments of the present disclosure, data skew of an MPP database can be addressed (that is, resolved or prevented) by using a hybrid data distribution mode. Upon recognition that data skew is present in the MPP database, a distribution mode can be converted from a pure mode (e.g., pure hash distribution) to a hybrid mode (e.g., hash distribution and round-robin distribution). The lower portion of FIG. 2 depicts the processing nodes 205 and 210 following conversion to hybrid distribution mode. The key value 7, which was the outlier key value exhibiting data skew, has been re-apportioned as segments 220 and 225 between the nodes 205 and 210, respectivley. The records of key value 7 are moved in a random distribution fashion—while in this example only two nodes are present, in an MPP database with many nodes the records of key value 7 would be distributed amongst all of the nodes, in a random distribution mode such as round-robin distribution. The other key values are unaltered, and continue to be distributed according to the initial distribution plan—for example, an initial hash distribution plan. Processes of monitoring and determining the occurrence of data skew in an MPP database, and of performing queries on a hybrid distribution system are described in detail below.

In order to address the potential for skew occurrence in an MPP database, a hybrid distribution mode can be implemented to prevent, or resolve, a storage imbalance issue caused by data skew. One aspect of implementing a hybrid distribution mode is to identify the most frequent key values, those that cause an imbalance in the system. These identified key values are called the "outlier set." The outlier set can be specified by a database administrator (DBA), for example via a DLL statement. It can also be generated automatically by the MPP database (e.g., at a coordinator node) during statistics collection time. The database system routinely collects statistics information, which include the frequency of distribution key values (e.g., a histogram). The outlier set can be identified by applying a data skew threshold to the histogram of distribution key values, as described further below. During runtime of an MPP database, at a time of distributing a record to a processing node, a determination is made of whether a key value of the record belongs in the outlier set. If the key value is not in the outlier set, the record is distributed using a hash distribution mode. If the key value does belong in the outlier set, the record is distributed to a processing node using a random distribution (e.g., round-robin distribution).

An exemplary DDL statement for generating a table having a skew threshold, and with hybrid distribution, is provided below:

Create table t (c1 int, c2 char(10), c3 text, c4 timestamp) distribute by hash (c1, c2) exception ((0, NULL), (NULL, NULL));

Table 't' is generated with four columns, where the records are distributed by hash of columns 1 and 2. The exception clause specifies the outlier set, where records of qualifying key values are distributed by a random distribution, such as round-robin. As an example, records (0, NULL, 1, 2) and (NULL, NULL, 3, 4) will be distributed to data nodes using random distribution method.

Another exemplary DDL statement for generating a table having a skew threshold, and with hybrid distribution, is provided below:

Create table r (c1 int, c2 char(10), c2 text, c3 timestamp) distribute by hash(c1, c2) exception system detect threshold 20% every monday;

Table 'r' is generated with three columns, where the records are distributed by hash of columns 1 and 2. The exception clause indicates that the system should conduct outlier set detection on distribution key (c1, c2) on a weekly base. An MPP database system will initially mark the table 'r' as in hash distribution mode. As data are added into the system and the system detects that a node is increasingly overloaded compared to other nodes, the system will initiate statistics collection on the key columns to determine whether data skew is present (e.g., the frequency of a key (c1, c2) exceed 20% in this case, according to process 300, described for FIG. 3). If so, the outlier set of keys is selected based on key value distribution, and saved to a system catalog. Further, the table 'r' is marked in hybrid distribution mode and some records of keys in the outlier set are asynchronously moved from the overloaded node(s) to other nodes using a round-robin algorithm. Further, any new records inserted into the table, after the change to hybrid distribution mode, will be distributed via hybrid distribution (e.g., random distribution). According to an embodiment of the present disclosure both the frequency of running the detection algorithm and the threshold by which skew is determination are configurable.

Supporting a hybrid distribution mode for an MPP database requires proper construction of alternative query plans. In particular, preferably one query plan is generated that is optimized for queries performed on records having a hash distribution, while another query plan is generated that is optimized for queries performed on records having random distribution. Therefore, for a query of a table in hybrid mode, a query optimizer of the coordinator node (e.g., coordinator node 105) first determines whether records having an outlier key value potentially qualify for the answer set of a query. If those records do not qualify as being in an outlier set, the records cannot have been distributed by random distribution, and the query plan is constructed in the same way as querying a standard hash distributed table. If the records do qualify as being in the outlier set, the query plan is constructed as for a round-robin distributed table.

Below are some exemplary query plans, for exemplary tables t (instantiated as a table with hybrid distribution) and r (instantiated as a table with pure hash distribution):

```
Create table t (c1 int, c2 char(10), c3 text) distribute by hash (c1)
except (10000);
Create table r (r1 int, r2 char(10), r3 double) distribute by hash(r1);
Q1:
SELECT * FROM t WHERE c1 = 10;
Plan 1:
Return
    Gather (from Node 1) //assuming key(10) hash to node 1
        TableScan
            Table: t
            Predicate c1 = 10;
Q2:
SELECT * FROM t WHERE c1 =10000;
Plan 2:
Return
    Gather (from ALL Nodes)
        TableScan //records with key 10000 are distributed to all nodes
            Table: t
            Predicate c1=10000;
Q3:
SELECT c2, sum(r3) FROM t JOIN r on c1=r1 and c1< 10000 group
    by c2
Plan 3:
Return
HashAgg(sum)
Gather (from all nodes)
    HashAgg(sum)
        Hash Join (c1=r1) filter(c2=r2)
        TableScan
            Table t
        TableScan
            Table r
Q4:
SELECT c2, sum(r3) FROM t LEFT JOIN r on c1=r1 and c<'abc' group
    by c2
Plan 4:
Return
    HashAgg(sum)
    Gather (from all nodes)
    HashAgg(sum)
    Hash Join (c1=r1)
    Redistribute by hash
    TableScan (filter c2 <'abc')
        Table t
    TableScan
        Table r
```

Regarding the first SELECT statement Q1, the query specifies records that do not qualify as outliers (outliers being those of c1=10000); Plan 1 is therefore generated for hash distribution, and the request is sent only to one node, calculated by hash function (the node corresponding to key value c10).

Regarding the second SELECT statement Q2, the query specifies records that do qualify as outliers, since the outlier key=10000 qualifies as the exception, except (10000), specified during table generation. Since the records qualify as being in the outlier set, Plan 2 is generated for the request to be sent to all nodes of the MPP database, as the records will have been distributed across all nodes according to a random distribution algorithm.

Regarding the third SELECT statement Q3, the query is a join query, and because of the local predicate on T (c1<10000), none of the records with outlier key from hybrid distributed T would qualify for the query. Plan 3 is generated as if T is hash distributed. Since the join is on the distribution key (c1 for table T and r1 for table R), the join can be done locally on each data node without data exchange between them.

Regarding the final SELECT statement Q4, the query specifies a selection of records from keys that cannot be ruled out from qualifying as outlier keys. In particular, the join on 'c1=r1,' without specifying a subset of 'c1,' may include c1=10000. Therefore, Plan 4 is generated conservatively, based on round-robin distribution of table t. A data movement operator (either redistribute, or broadcast on one or both tables) is needed to account for all key values. In the exemplary Plan 4, a hash redistribute operator is specified prior to TableScan of table 't.' According to embodiments of the present disclosure, the redistribute operator can readily be optimized to ship only the records having an outlier key to a node determined by hash. That is, not all records need to be moved, since those records distributed by the hash algorithm already reside on the node determined by the hash function.

According to embodiments of the present disclosure an MPP database can be automatically switched (e.g., converted) from having an initial hash distribution mode to having a hybrid distribution mode. The MPP database is able to periodically monitor system statistics, and upon detection of skew in the processing nodes, the MPP database is converted to hybrid distribution mode.

Figure 3:
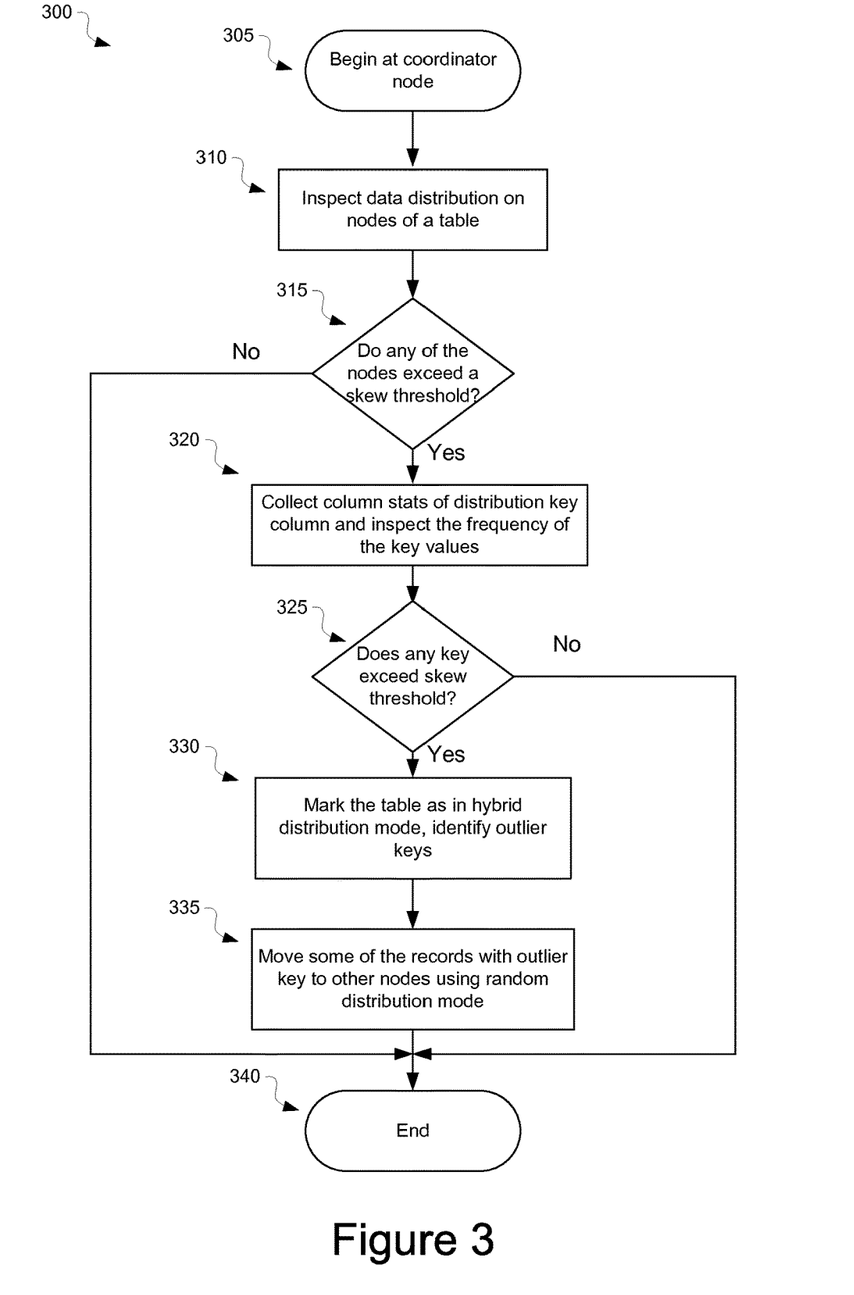
FIG. 3 is flowchart illustrating an exemplary distribution conversion process, in accordance with an embodiment of the present disclosure.

FIG. 3 is a flowchart 300 of a process of converting a table in an MPP database from a hash distribution to a hybrid distribution, according to an embodiment of the present disclosure. Steps 305-340 describe exemplary steps comprising the process depicted in flowchart 300 in accordance with the various embodiments herein described. In one embodiment, the flowchart 300 is implemented as computer-executable instructions stored in a computer-readable medium and performed by a computing device executing a process for table distribution conversion. Process 300 is able to be performed during runtime of an MPP database. Process 300 may be performed autonomously by an MPP database system.

The process begins at step 305 at a coordinator node (e.g., coordinator node 105) and continues to step 310, where an inspection is made of data distribution on one or more nodes of a table in an MPP database. At step 315 a determination is made of whether any of the inspected nodes from step 310 exceed a skew threshold value for the table. If NO, the process 300 skips to step 340, where the process ends. If YES, the process 300 proceeds to step 320.

At step 320 column stats are collected for a distribution key column, and an inspection is made of the frequency of occurrence for the key values. The process 300 continues to step 325, where a determination is made of whether any key values exceed a skew threshold for the MPP system. If NO, the process 300 skips to step 340, where the process ends. If YES, the MPP database is determined to be skewed on at least one key value and the process 300 proceeds to step 330. The skew threshold is configurable, and may be met when the size (e.g., number of records) of the node exceeds a threshold. For example, the number may be an absolute number (for example, 15000 records), or a relative number (e.g., 100× the average number of records for keys of the system). Alternatively, the threshold may be based on a query frequency for the key values. In addition, the threshold may comprise a time-based (periodic) threshold, user-defined threshold, a manually triggered threshold, a threshold based on a projected number of database records (e.g., based on related historical data records), or any other threshold, as determined by a DBA. A system default threshold can be set during system installation.

At step 330 the table is marked to be in hybrid distribution mode, which is a combination of hash distribution and random distribution (e.g., round-robin distribution). Further, the specific keys that were determined as skewed, in step 325, are identified as outlier keys.

At step 335 a portion of the records having an outlier key (the outlier key specified in step 330) are moved to other nodes in the MPP database. The records are distributed in random fashion, and are able to be moved asynchronously from the execution of process 300. The MPP database is therefore converted into hybrid distribution mode, where key values identified as outliers by process 300 have records with random distribution amongst processing nodes of the MPP database, while other key values retain hash distribution. Once the schema is modified, the former query plan will be invalidated, and a new one constructed. For a cached plan, which has previously been compiled, the cache will be deleted and a new plan will be generated and subsequently cached. For transaction consistency, Step 330 and step 335 are preferably performed together as an automatic operation.

While the MPP database is described as initially having a hash distribution mode, other distribution modes are possible (e.g., range, list). In either case, the initial distribution is "pure" in the sense that only one distribution mode is employed for the MPP database. Therefore, the query plan for the MPP database will be conventional, corresponding to the initial distribution mode of the MPP database. Only following determination of the presence of skew, according to the specified skew threshold, will the distribution mode be converted to a hybrid distribution mode. Once conversion is made to hybrid distribution mode, an update is made to the query plan of the MPP database to reflect the hybrid nature. Specifically, the process 300 identities, and registers (e.g., in a catalog) which record(s) are outliers and will require querying according to the outlier plan. The other records (e.g., non-outlier) continue to be queried according to the initial (e.g., hash) plan.

Further, in an embodiment the records of the one or more keys identified as outliers in step 330 will continue to be distributed in random mode, that is, records entered into the MPP database subsequent to the initial determination that the keys having skew will be randomly distributed amongst processing nodes of the MPP database.

An MPP database with a hybrid distribution mode can efficiently query records by taking into account under which distribution mode queried records are stored. That is, a query involving records of keys included in the outlier set must consider all processing nodes of the MPP database, since such records are distributed according to random (e.g., round-robin) scheme. However, records of keys not belonging to the outlier set are distributed according to a hash distribution, and therefore may be efficiently searched using a hash value search (that is, only on the processing nodes storing the keys of the queried records).

Figure 4:
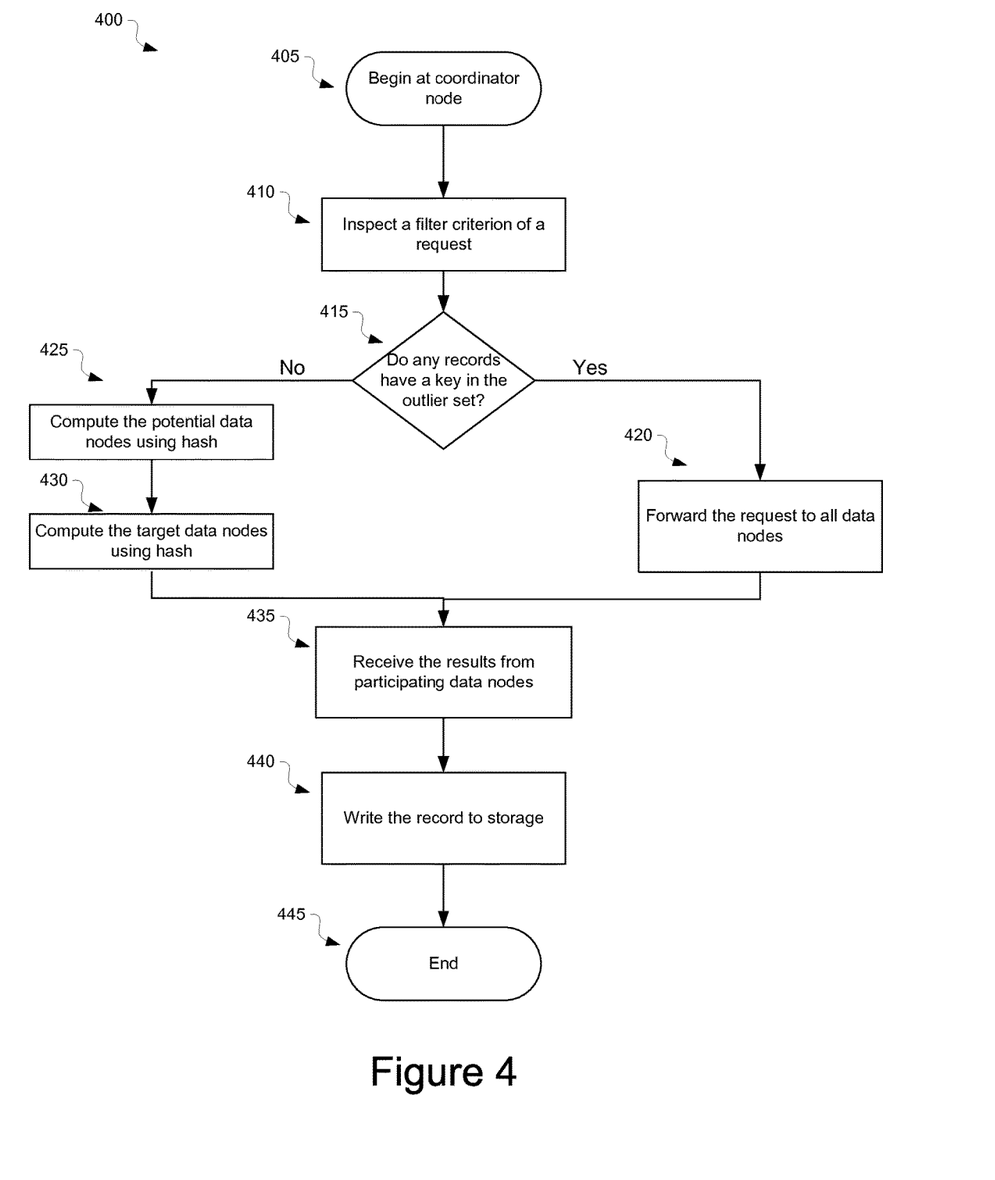
FIG. 4 is a flowchart illustrating an exemplary record lookup process, in accordance with an embodiment of the present disclosure.

FIG. 4 is a flowchart 400 of a process of looking up a record in an MPP database having a hybrid distribution, according to an embodiment of the present disclosure. Steps 405-445 describe exemplary steps comprising the process depicted in flowchart 400 in accordance with the various embodiments herein described. In one embodiment, the flowchart 400 is implemented as computer-executable instructions stored in a computer-readable medium and performed by a computing device executing a process for looking up records in an MPP database.

The process begins at step 405 at a coordinator node (e.g., coordinator node 105) and continues to step 410, where an inspection is made of a filter criterion of a data request to an MPP database. At step 415 a determination is made of whether any of the records referenced by the data request belong to an outlier set (e.g., outlier set as determined from process 300). If YES, the process 400 proceeds to step 420. At step 420 the request is forwarded to all processing nodes for execution, because the records (which belong to a key in the outlier set) will have been distributed amongst all of the processing nodes.

If NO, the records do not belong to any outlier keys, and the process 400 proceeds to step 425. At step 425 the potential processing nodes having qualifying records are calculated using a hash function, as these records will have been distributed according to hash distribution mode. The process continues as step 430, where a calculation is made of the target data nodes of the request using a hash function.

At step 435 the results of the request are received at the participating data nodes, the participating nodes determined according to either step 420 or 430 (depending on whether or not the records belong to a key in the outlier set). At step 440 the resulting records are written to storage, and the process ends at step 445.

When a record to be inserted into a hybrid distributed table arrives at the MPP database, a determination is made of whether the key corresponding to the record is in the outlier set. If the key is in the outlier set, the system selects a node (e.g., a target node) in round-robin or random fashion and writes the record on the selected processing node to storage. If the key is not in the outlier set, a node is selected using a hash function and the record is written to the selected processing node. The determination of the target node can be done statically at statement compilation/optimization time if the distribution key value of the record is specified as literal in the insert statement (e.g., without a wildcard or parameter marker); otherwise, the determination is performed dynamically at execution time by the coordination node (e.g., coordinator node 105) of the transaction.

Figure 5:
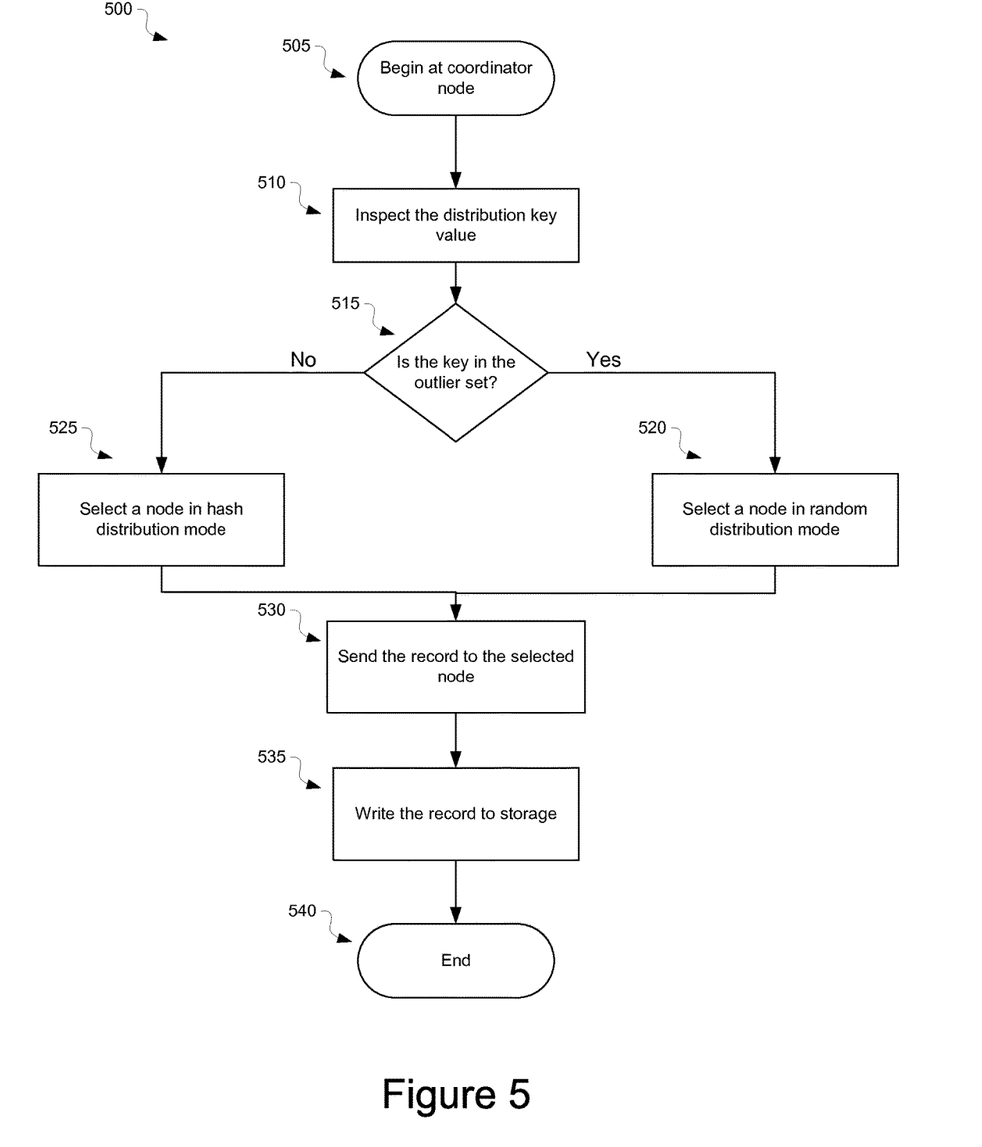
FIG. 5 is a flowchart illustrating an exemplary record insertion process, in accordance with an embodiment of the present disclosure.

Referring now to FIG. 5, a flowchart 500 of a process for inserting a record into a hybrid distributed table is depicted. Steps 505-540 describe exemplary steps comprising the process depicted in flowchart 500 in accordance with the various embodiments herein described. In one embodiment, the flowchart 500 is implemented as computer-executable instructions stored in a computer-readable medium and performed by a computing device executing a process for inserting a record in an MPP database.

The process begins as step 505 at a coordinator node (e.g., coordinator node 105) and continues to step 510. At step 510 an inspection is made of the distribution key value of the record. At step 515, a determination is made of whether or not the distribution key value belongs in the outlier set. If YES, the process continues to step 520, where a processing node in the MPP database is selected according to a random or round-robin algorithm. If NO, the process continues to step 525, where a processing node is selected according to a hash distribution mode.

At step 530 the record is sent to the selected processing node, determined according to either step 520 or 525 (depending on whether or not the records belong to a key in the outlier set). At step 535 the record is written to storage on the selected processing node, and the process ends at step 540.

While not depicted in FIG. 5, a deletion operation can be performed in a similar manner to the insertion process 500. Further, an update operation is able to be decomposed into a combination of a deletion and an insertion, where the old record is deleted and the new record is inserted. Therefore, an update is performed by combination of insert and delete processes as described.

Table Join for Hybrid Data Distribution

Figure 6:
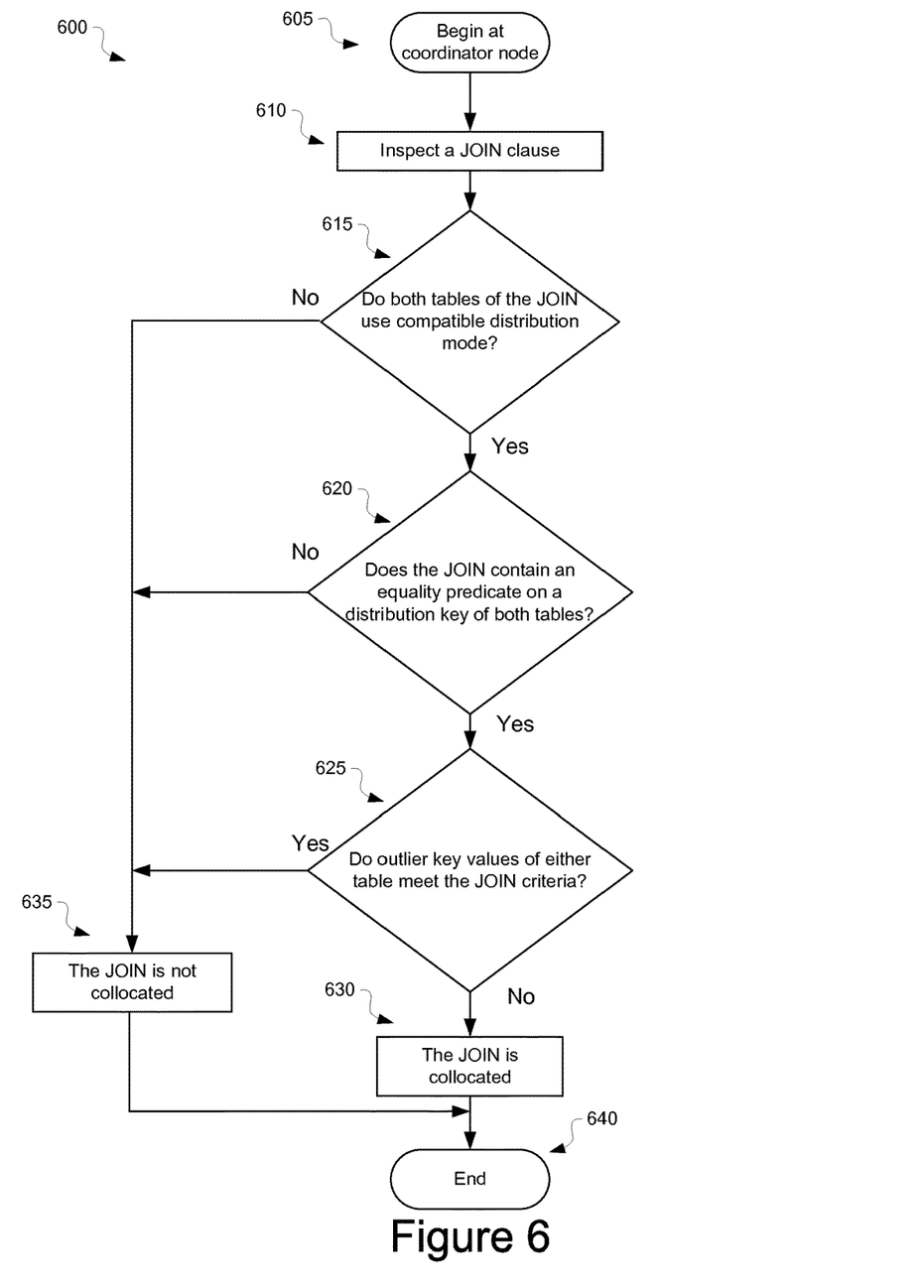
FIG. 6 is a flowchart illustrating an exemplary process for determining a collocation state of a join statement, in accordance with an embodiment of the present disclosure.

FIG. 6 is a flowchart 600 of a process of determining a collocation condition of tables for a join statement in an MPP database having a hybrid distribution, according to an embodiment of the present disclosure. Steps 605-640 describe exemplary steps comprising the process depicted in flowchart 600 in accordance with the various embodiments herein described. In one embodiment, the flowchart 600 is implemented as computer-executable instructions stored in a computer-readable medium and performed by a computing device executing a process for performing a join of tables in an MPP database. In one aspect, the process depicted in flowchart 600 is used to determine if a data movement operator is necessary when a join is performed between a hybrid distributed table and a table that is either hash-or hybrid distributed.

The process begins as step 605 at a coordinator node (e.g., coordinator node 105) and continues to step 610. At step 610 an inspection is made of a join clause of a query. At step 615, a determination is made of whether or not the tables referenced in the query use a compatible distribution mode. That is, if both tables use a hash distribution mode, or both tables use a hybrid distribution mode; furthermore, the set of nodes to which both tables are distributed are the same; then the distribution mode of both table are considered compatible. Otherwise, the distribution mode is considered not compatible. If the distribution is not compatible, it can be determined that the join cannot be collocated, as is done at step 635, and the process ends at 640. As described above, a query involving non-collocated records must be executed according to a conservative query plan, and redistribute or broadcast records of all processing nodes in the MPP database.

If at step 615 the determination is YES, the process continues to step 620. At step 620 a determination is made of whether the join contains an equality predicate on a distribution key shared by both tables. If NO, it can be determined that the join is not collocated, as is done at step 635, and the process goes to end at 640. If YES, a determination is made at step 625 of whether or not any outlier keys (those that are distributed according to random mode) meet the join criteria. If YES, the records will have to be distributed across all processing nodes, and the join is determined as not collocated at step 635 and proceed to end at 640. If NO, the join is determined to be collocated, as the records of keys referenced by the join will have been distributed according to a hash distribution mode, and to the same processing node. The query can therefore proceed with a query plan that leverages a directed lookup by hash value (as no data movement operator is required), and the process ends at 640.

Exemplary Computing System

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be database servers, storage devices, desktop computer systems, portable computer systems, handheld devices, networking devices or any other device that incorporates hard-wired and/or program logic to implement the techniques.

Figure 7:
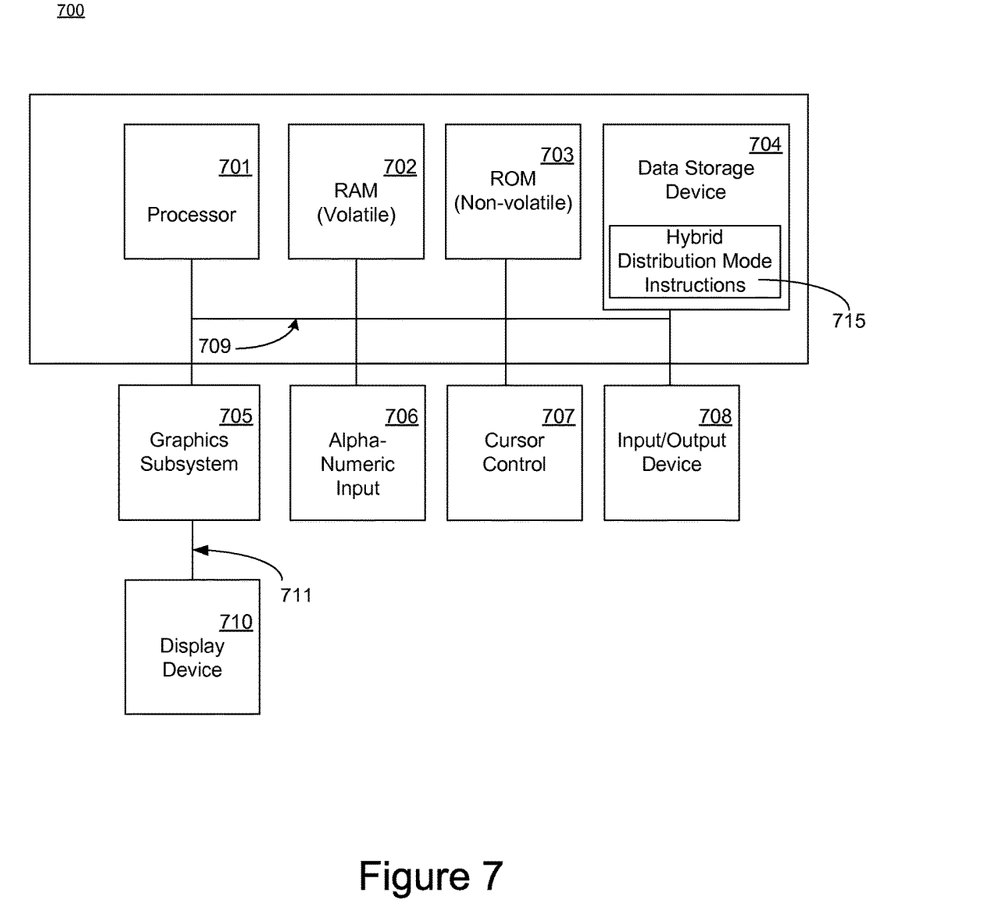
FIG. 7 is a block diagram illustrating an exemplary computer system, with which embodiments of the present disclosure may be implemented.

FIG. 7 illustrates an exemplary configuration of an apparatus 700 in accordance with various embodiments of the present disclosure. The exemplary system 700 upon which embodiments of the present invention may be implemented includes a general purpose computing system environment. In its most basic configuration, computing system 700 typically includes at least one processing unit 701 and memory, and an address/data bus 709 (or other interface) for communicating information. Depending on the exact configuration and type of computing system environment, memory may be volatile (such as RAM 702), non-volatile (such as ROM 703, flash memory, etc.) or some combination of the two.

Computer system 700 may also comprise an optional graphics subsystem 705 for presenting information to the computer user, e.g., by displaying information on an attached display device 710, connected by a video cable 711. According to embodiments of the present disclosure, the graphics subsystem 705 may be coupled directly to the display device 710 through the video cable 711. In alternate embodiments, display device 710 may be integrated into the computing system (e.g., a laptop or netbook display panel) and will not require a video cable 711.

Additionally, computing system 700 may also have additional features/functionality. For example, computing system 700 may also include additional storage media (removable and/or non-removable) including, but not limited to, magnetic or optical disks or tape. Such additional storage is illustrated in FIG. 7 by data storage device 704. Computer storage media includes volatile and nonvolatile, removable and non-removable media implemented in any method or technology for storage of information such as computer readable instructions, data structures, program modules or other data. RAM 702, ROM 703, and data storage device 704 are all examples of computer storage media. Data storage device 704 may include hybrid data distribution mode instructions 715, which comprise software that is executable by a processor (e.g. 701) to impart the computing system 700 with some or all of the functionality described herein.

Computer system 700 also comprises an optional alphanumeric input device 706, an optional cursor control or directing device 707, and one or more signal communication interfaces (input/output devices, e.g., a network interface card, and/or a transmitter and receiver, also called a "transceiver") 708. Optional alphanumeric input device 706 can communicate information and command selections to central processor 701. Optional cursor control or directing device 707 is coupled to bus 709 for communicating user input information and command selections to central processor 701. Signal communication interface (input/output device) 708, also coupled to bus 709, can be a serial port. Communication interface 708 may also include wireless communication mechanisms. Using communication interface 708, computer system 700 can be communicatively coupled to other computer systems over a communication network such as the Internet, a software defined network (SDN), or an intranet (e.g., a local area network), or can receive data (e.g., a digital television signal).

In the foregoing detailed description of embodiments of the present invention, numerous specific details have been set forth in order to provide a thorough understanding of the present invention. However, it will be recognized by one of ordinary skill in the art that the present invention is able to be practiced without these specific details. In other instances, well-known methods, procedures, components, and circuits have not been described in detail so as not to unnecessarily obscure aspects of the embodiments of the present invention. Although a method is able to be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part.

Embodiments according to the present disclosure are thus described. While the present disclosure has been described in particular embodiments, it is intended that the invention shall be limited only to the extent required by the appended claims and the rules and principles of applicable law.

What is claimed is:

1. A method of managing a massively parallel processing (MPP) database comprising a plurality of processing nodes, the method comprising:

receiving first and second requests regarding respective first and second database records of the MPP database, the MPP database storing database records according to a hybrid data distribution mode, the hybrid data distribution mode distributing database records associated with a set of outlier keys according to a random distribution method, and distributing database records associated with keys not within the set of outlier keys according to a hash distribution method, the set of outlier keys satisfying at least one criterion indicating a frequency of occurrence of respective ones of the outlier keys in the database records;

determining that the first database record has a key in the set of outlier keys and determining that the second database record has a key that is not in the set of outlier keys;

forwarding the second request to at least one selected processing node of the MPP database, wherein the at least one selected processing node is selected according to a hash value of the key of the second database record;

forwarding the first request to all processing nodes of the MPP database:, receiving a third request the third request comprising a table join statement for joining a first table and a second table of the MPP database; and determining a collocation status of the table join statement by:

determining a distribution mode of the first table and of the second table;

determining whether the table join statement includes an equality predicate on a distribution key of both the first table and the second table; and determining whether respective sets of outlier keys of the first table and the second table qualify for joining.

2. The method according to claim 1, wherein the first and second requests are requests for lookups of the respective first and second database records.

3. The method according to claim 1, wherein each of the first and second requests is a request for one of insertion, deletion, and update of the database record.

4. The method according to claim 1, wherein the first table and second table are determined to be collocated when the distribution mode of the first table is compatible with the distribution mode of the second table, the table join statement includes the equality predicate on the distribution key of both the first table and the second table, and the respective sets of outlier keys of the first table and the second table do not qualify for joining; wherein the table join statement is processed using a hash distribution query plan.

5. The method according to claim 1, wherein the first table and the second table are determined not to be collocated and the table join statement is processed using a random distribution query plan responsive to the distribution mode not being the same for the first table and the second table.

6. The method according to claim 1, wherein the first table and second table are determined not to be collocated and the table join statement is processed using a random distribution query plan responsive to the table join statement not including the equality predicate on the distribution key of both the first table and the second table.

7. The method according to claim 1, wherein the first table and second table are determined not to be collocated and the table join statement is processed using a random distribution query plan responsive to the respective sets of outlier keys of the first table and the second table qualifying for joining.

8. A method of managing a massively parallel processing (MPP) database comprising a plurality of processing nodes, the method comprising:
receiving a first request comprising a first query including a first table join clause for joining a first table and a second table in the MPP database, the MPP database storing database records according to a hybrid data distribution mode, the hybrid data distribution mode distributing database records associated with a set of outlier keys according to one of a round-robin distribution method and a random distribution method, and distributing database records associated with keys not within the set of outlier keys according to a hash distribution method, the set of outlier keys satisfying at least one criterion indicating a frequency of occurrence of respective ones of the outlier keys in the database records;
determining that the first and second tables are collocated by:
determining that a distribution mode of the first table is compatible with a distribution mode of the second table;
determining that the first table join clause includes an equality predicate on a distribution key of both the first table and the second table; and
determining that respective sets of outlier keys of the first table and the second table qualify for joining.

9. The method of claim 8 further comprising processing the query using a query plan that employs a directed lookup by hash value.

10. The method according to claim 8, further comprising receiving a second query comprising a second table join clause for joining a third table and a fourth table in the MPP database, wherein the third table and fourth table are determined not to be collocated and the second table join clause is processed using a random distribution query plan responsive to the distribution mode not being the same for the third table and the fourth table.

11. The method according to claim 8, further comprising receiving a second query comprising a second table join clause for joining a third table and a fourth table in the MPP database, wherein the third table and fourth table are determined not to be collocated and the second table join clause is processed using a random distribution query plan responsive to the second table join clause not including the equality predicate on the distribution key of both the third table and the fourth table.

12. The method according to claim 8, further comprising receiving a second query comprising a second table join clause for joining a third table and a fourth table in the MPP database, wherein the third table and fourth table are determined not to be collocated and the second table join clause is processed using a random distribution query plan responsive to the respective sets of outlier keys of the third table and the fourth table qualifying for joining.

13. An apparatus for use in a database management system for managing a massively parallel processing (MPP) database, the apparatus comprising:
a plurality of processing nodes;
an interconnect coupled to the plurality of processing nodes; and
a coordinator node, coupled to the interconnect to control data flow to the plurality of processing nodes via the interconnect, the coordinator node configured to:
receive first and second requests regarding respective first and second database records of the MPP database, the MPP database storing database records according to a hybrid data distribution mode, the hybrid data distribution mode distributing database records associated with a set of outlier keys according to a random distribution method, and distributing database records associated with keys not within the set of outlier keys according to a hash distribution method, the set of outlier keys satisfying at least one criterion indicating a frequency of occurrence of respective ones of the outlier keys in the database records;
determine that the first database record has a key in the set of outlier keys and determine that the second database record has a key that is not in the set of outlier keys;
forward the second request to at least one selected processing node of the plurality of processing nodes, wherein the at least one selected processing node is selected according to a hash value of the key of the second database record,
forward the first request to all processing nodes of the MPP database;
receive a third request the third request comprising a table join statement for joining a first table and a second table of the MPP database, and
determine a collocation status of the table join statement by:
determining a distribution mode of the first table and of the second table;
determining whether the table join statement includes an equality predicate on a distribution key of both the first table and the second table; and
determining whether respective sets of outlier keys of the first table and the second table qualify for joining.

14. The apparatus according to claim 13, wherein the first and second requests are requests for lookups of the respective first and second database records.

15. The apparatus according to claim 13, wherein each of the first and second requests is a request for one of insertion, deletion, and update of the database record.

16. The apparatus according to claim 13, wherein:
the coordinator node is configured to determine that first table and second table are collocated when the distribution mode of the first table is compatible with the distribution mode of the second table, the table join statement includes the equality predicate on the distribution key of both the first table and the second table, and the respective sets of outlier keys of the first table and the second table do not qualify for joining; and
the coordinator node is further configured to process the table join statement using a hash distribution query plan.

17. The apparatus according to claim 13, wherein the first table and second table are determined not to be collocated and the table join statement is processed using a random distribution query plan responsive to at least one of the following being true:

(a) the distribution mode of the first table is not the same as the distribution mode of the second table;
(b) the table join statement does not include the equality predicate on the distribution key of both the first table and the second table; or,
(c) the respective sets of outlier keys of the first table and the second table qualify for joining.

* * * * *